United States Patent [19]
Baldomero

[11] Patent Number: 6,024,370
[45] Date of Patent: Feb. 15, 2000

[54] DAMPING CARTRIDGE FOR HIGH PERFORMANCE SUSPENSION SYSTEMS

[75] Inventor: Ricardo R. Baldomero, Felton, Calif.

[73] Assignee: Rockshox, Inc., San Jose, Calif.

[21] Appl. No.: 09/023,644

[22] Filed: Feb. 13, 1998

Related U.S. Application Data

[60] Provisional application No. 60/051,717, Jul. 3, 1997.

[51] Int. Cl.[7] .................................................. B26K 25/08
[52] U.S. Cl. .................... 280/276; 188/312; 188/322.19; 267/129
[58] Field of Search ..................................... 280/275, 276, 280/283, 284; 267/129, 120, 118, 124; 188/283, 312, 316, 322.17, 322.16, 322.19

[56] References Cited

U.S. PATENT DOCUMENTS

| | | |
|---|---|---|
| 1,973,706 | 9/1934 | Hawley . |
| 4,012,055 | 3/1977 | Ottow ........................................ 280/276 |
| 5,367,918 | 11/1994 | Chang et al. ............................. 280/279 |
| 5,456,480 | 10/1995 | Turner et al. ............................. 280/276 |
| 5,615,867 | 4/1997 | Bauer .................................... 267/64.11 |

*Primary Examiner*—Anne Marie Boehler
*Attorney, Agent, or Firm*—Skadden, Arps, Slate, Meagher & Flom; David W. Hansen

[57] ABSTRACT

A damping system having a lightweight, low-cost, thin-walled cartridge body sealed on both ends by mechanically deforming the cartridge body wall into sealing elements that seal the ends of the cartridge body. Preferably, the cartridge body wall is roll crimped to compress the sealing elements and thereby create a seal between the wall and the sealing elements. The cartridge body is preferably also provided with a retaining ring having an internally formed ridge that engages the mechanically deformed portion of the cartridge body wall. The retaining ring is thereby axially fixed with respect to the cartridge body. Because the retaining ring is positioned about the cartridge body, the retaining ring forms a shoulder with respect thereto. The shoulder thereby formed may be inserted within the recess of a bicycle suspension fork strut to fix the damping cartridge therein against movement.

17 Claims, 2 Drawing Sheets

DAMPING CARTRIDGE FOR HIGH PERFORMANCE SUSPENSION SYSTEMS

CROSS-REFERENCE To RELATED APPLICATION

The present application claims the benefit of the earlier filing date of co-pending U.S. Provisional Patent Application Ser. No. 60/051,717, filed Jul. 3, 1997.

BACKGROUND OF THE INVENTION

The present invention relates to the design and construction of damping systems for suspension systems. More particularly, the present invention relates to the design and construction of a lightweight, low-cost damping cartridge having sealed ends for use in high performance suspension systems, particularly high performance bicycle suspension systems.

Suspension systems incorporating hydraulic damping systems are well-known. Such systems are frequently used in the motorcycle and automotive fields, as well as in the field of bicycles. For example, U.S. Pat. No. 5,456,480 to Turner and McAndrews (the "'480 patent"), which has been assigned to the assignee of the present invention and which is incorporated herein in its entirety, discloses a suspension system for use in a bicycle fork. The suspension system disclosed in the '480 patent includes a damping system in the form of a replaceable damping cartridge unit.

The cartridge unit of the '480 patent has a cylindrical damping cartridge body containing hydraulic oil and enclosing a piston attached to a piston rod. The cartridge unit further includes cartridge seals at both ends. The piston sealingly engages the inner surface of the cartridge body and divides the cartridge body into two chambers. The piston is fixedly mounted to the piston rod so that the piston and piston rod move together along the longitudinal axis of the cartridge body. The piston rod slidably extends through the cartridge seals at both ends of the cartridge body to move the piston along the axial extent of the cartridge body. Ports extend through the piston as well as through the piston rod, so that upon movement of the piston in the cartridge body, hydraulic oil passes from one side of the piston to the other. The restriction of the passages determines the degree of resistance effected as the oil is forced through the passages, and thus determines the amount of damping achieved for a given piston speed.

As illustrated in the '480 patent, the bicycle suspension fork in which the disclosed damping system is used has a pair of telescoping struts, each telescoping strut having an inner tube telescopingly engaged within an outer tube. The damping cartridge is coupled within the inner tube of one of the struts and the piston rod is coupled to the outer tube of that strut. Thus, compression or expansion of the strut causes the damping fluid to move from one side of the piston to the other side and thereby damp the suspension system.

The cartridge seals positioned in the ends of the cartridge body are vital to the proper operation of the cartridge unit, as they prevent oil leakage from between the seal and the inner surface of the cartridge body, and between the seal and the outer surface of the piston rod. Typically, the need to secure the seals properly within the ends of the cartridge body has required that the walls of the cartridge body be sufficiently thick to accommodate threads, a groove for a snap-ring, or to permit an interference-fit connection for retaining a hard rubber seal secured to the inner surface of the end of the cartridge body. In addition, as illustrated in the '480 patent, one end of the cartridge body may further include a flange to seat one of the seals securely therein. The use of such thick walls results in cartridge bodies that have more material than is desirable, and that are, as a result, heavier and more costly to manufacture than desirable. The use of threaded, press-fit, or flange attachments for coupling the cartridge unit to the strut also adds unnecessary weight to, and increases the cost of manufacture of, the cartridge body.

In the '480 patent, a cartridge body has an integral shoulder proximate to its first end that mates with a recess in the upper strut of the telescoping fork assembly. As the shoulder seats against the recess, the cartridge unit is prevented from traveling upward into the upper strut. A snap-ring is then used to prevent the damping cartridge from traveling downward and out of the lower end of the upper strut. Although such a manner of coupling the cartridge body in place within a strut is well constructed and secure, it would be desirable to achieve such coupling in a lighter weight, less costly manner.

SUMMARY OF THE INVENTION

It is therefore an object of the present invention to provide a lightweight, low-cost cartridge body for a damping system.

It is another object of the present invention to provide a cartridge body having seals coupled within the ends of the cartridge body in such a manner that a thin-walled cartridge body may be used.

It is another object of the present invention to provide a cartridge body having an externally applied retaining element formed from a material lighter than the material of the cartridge body and positioned and shaped for fixedly coupling the cartridge body to a strut of a suspension system.

The above and other advantages are realized in accordance with the principles of the present invention by providing a lightweight, thin-walled damping cartridge body that is sealed, preferably at both ends, through the use of a sealing element and the mechanical deformation of the cartridge body with respect to the sealing element. Preferably, the sealing elements are O-ring seals positioned in grooves formed in end caps inserted in the ends of the cartridge body, the thin-walled cartridge body being crimped at the location of the seals so that the seals are compressed by and thereby seal the wall of the cartridge body. Additionally, a cartridge retaining ring is positioned around and secured to the crimped portion of one end of the cartridge body. The retaining ring provides a shoulder that engages the strut (or other member in which the cartridge is positioned) to prevent axial movement of the cartridge body with respect to the strut. Preferably, the retaining ring is formed from a material that is lighter in weight than the material of the cartridge body, thereby reducing the overall weight of the damping system.

The above and other objects, features, and advantages of the present invention will be readily apparent from the following detailed description of the invention taken in conjunction with the accompanying drawings wherein like reference characters represent like elements, the scope of the invention being set out in the appended claims.

DETAILED DESCRIPTION OF THE INVENTION

Figure 1:
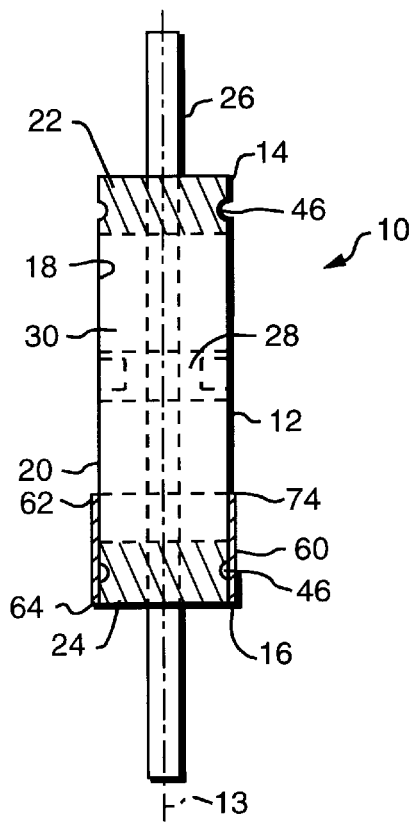
FIG. 1 is a cross-sectional view of a damping system formed in accordance with the principles of the present invention.
Figure 2:
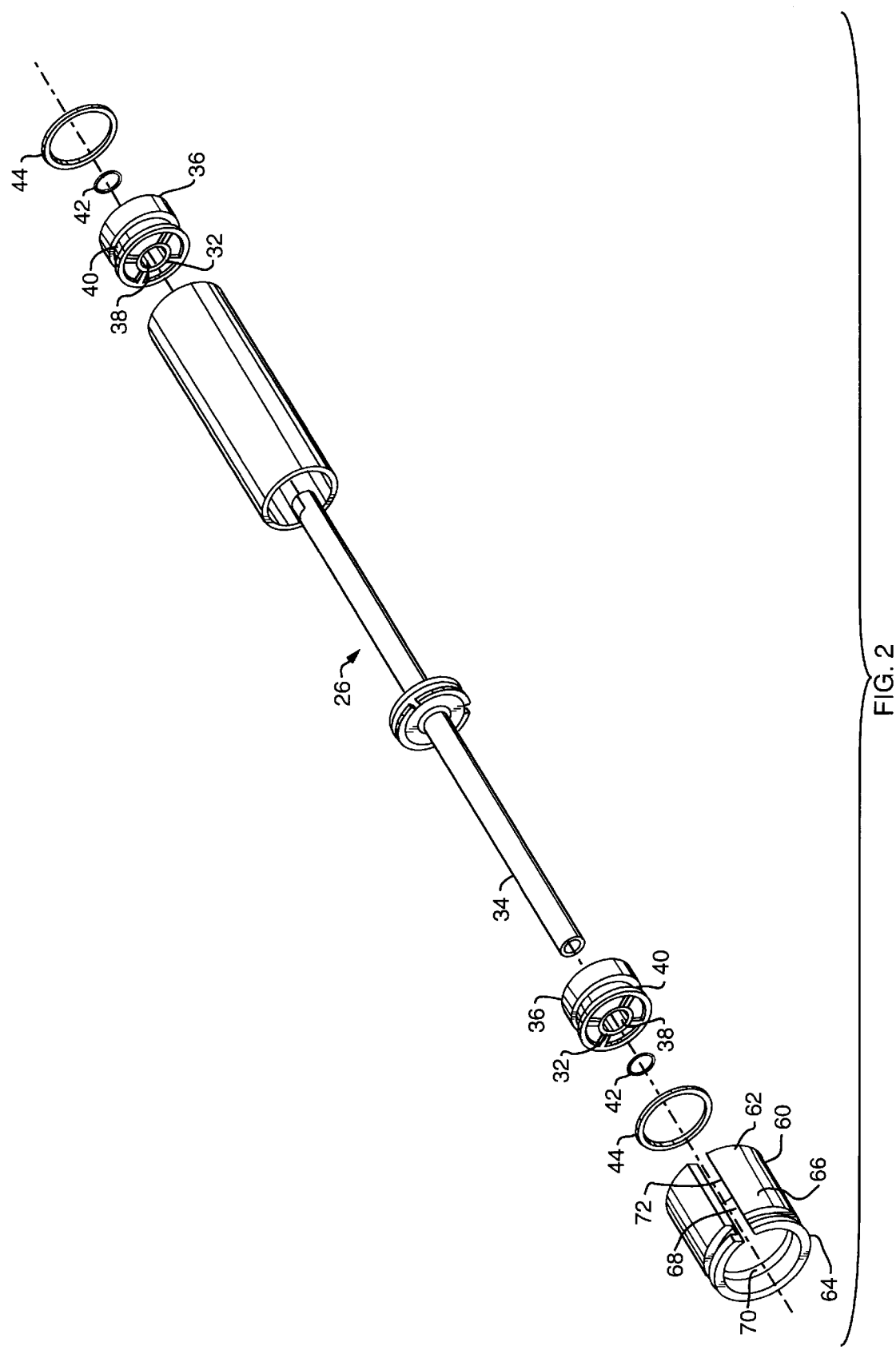
FIG. 2 is an exploded perspective view of the damping system of FIG. 2.

As illustrated in FIGS. 1 and 2, the damping system 10 of the present invention includes a cylindrical cartridge body 12 having a longitudinal axis 13, first and second ends 14, 16, an inner surface 18, and an outer surface 20. First and second ends 14, 16 of cartridge body 12 are closed by cartridge end caps 22, 24, respectively. Damping system 10 also includes a piston rod 26 with a piston 28 fixedly attached thereto. Piston 28 is enclosed within cartridge body 12 and divides the interior of cartridge body into first and second chambers as described in further detail in the '480 patent incorporated by reference herein. Cartridge end caps 22, 24 are annular so that piston rod 26 may extend through a hole formed in each of end caps 22, 24 to slidably move with respect to cartridge body 12, and thereby move piston 28 axially (along longitudinal axis 13) within cartridge body 12. It will be appreciated that piston rod 26 need not extend completely through cartridge body 12, and in such a configuration, only one of end caps 22, 24 would be used, with rod 26 extending therethrough and into cartridge body 12. In a preferred embodiment of the present invention, however, both end caps 22 and 24 are used and rod 26 extends into and through cartridge body 12.

Cartridge body 12 contains a damping fluid 30. End caps 22, 24 thus each further include an inner sealing surface 32 for sealing end caps 22, 24 with respect to the outer surface 34 of piston rod 26 and an outer sealing surface 36 for sealing end caps 22, 24 with respect to inner surface 18 of cartridge body 12, as shown more clearly in FIG. 2. In a preferred embodiment of the present invention, end caps 22, 24 are made from a lightweight, inexpensive material such as nylon, aluminum, hard rubber, or another material enabling end caps 22, 24 to form a seal against cartridge body 12 and piston rod 26 without the need for additional sealing elements. Preferably, however, seating grooves 38, 40 are respectively provided in sealing surfaces 32, 36 of each end cap 22, 24. An inner seal 42, such as an inner O-ring, may thus be seated within each of inner seating grooves 38 to seal end caps 22, 24 with respect to piston rod 26. Likewise, an outer seal 44, such as an outer O-ring, may be seated within each of outer seating grooves 40 to seal end caps 22, 24 with respect to cartridge body 12.

The elements of damping system 10 of the present invention are formed and assembled as follows. Cylindrical cartridge body 12 is formed from a thin-walled, lightweight elongated tube which may be made from aluminum, plastic or another lightweight material. Most preferably, cartridge body 12 is made from a readily available lighweight material such as 6061-t6 aluminum. In addition, cartridge body 12 preferably has a wall thickness of about 0.030 inches.

In the preferred embodiment of the present invention, one of end caps 22, 24 is positioned within damping cartridge 12 at one end of cartridge body 12. Cartridge body 12 contains a fluid 30, such as glycerine, fish oil, water or, preferably, hydraulic oil. Piston rod 26, with piston 28 mounted thereon is inserted through end caps 22, 24 such that piston 28 is positioned within cartridge body 12. The other of end caps 22, 24 is positioned within the other end of cartridge body 12 to close cartridge body 12. It will be appreciated that the exact order of assembly of the elements of damping system 10 may be altered as desired, so long as the resulting system comprises a cartridge body 12 containing damping fluid 30, and enclosing a piston 28 mounted on a piston rod 26 that slides through end caps 22, 24 on either end of cartridge body 12.

The wall of cartridge body 12 is then mechanically deformed, preferably by being crimped, at ends 14, 16, at the locations of outer seals 44, to engage outer seals 44 so that outer seals 44 are compressed to seal cartridge end caps 22, 24 with respect to cartridge body 12. It will be understood that if end caps 22, 24 alone form the sealing elements of cartridge body 12, then the cartridge body wall may be crimped into end caps 22, 24 to seal ends 14, 16 of cartridge body 12. As will be evident to those having skill in the art, the crimping process must be regulated to ensure that the integrity of outer seals 44, and thus their sealing capability, is not compromised. Preferably, the crimping process is completed using a roll-crimping device so that the full circumference of cartridge body 12 is crimped at the locations of outer seals 44. As may be seen in FIG. 1, the crimping of cartridge body 12 results in at least one groove 46, and possibly a plurality of grooves, being formed in the portion of outer surface 20 of cartridge body 12 adjacent end caps 22, 24. An important use of groove 46 will be discussed in greater detail below.

Figure 3:
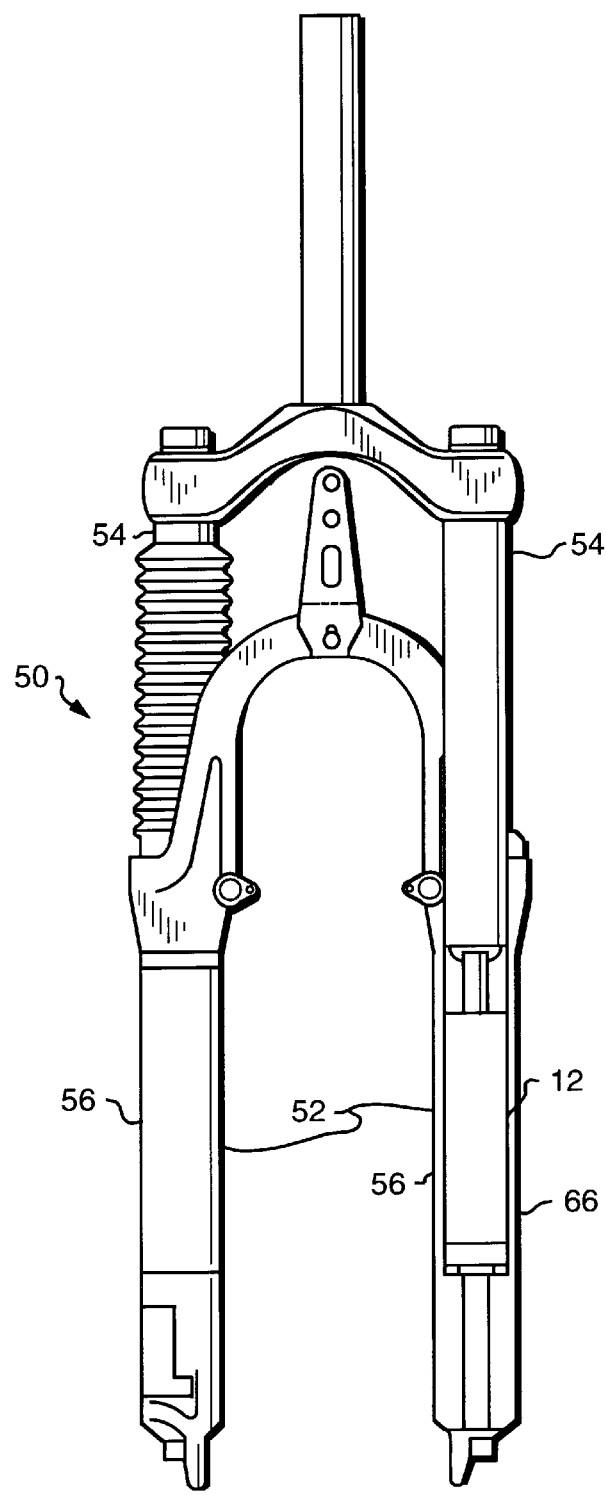
FIG. 3 is an elevational view, partly in section, of a bicycle suspension fork having a damping system as shown in FIGS. 1 and 2.

Although damping system 10 of the present invention may be used in any suspension system, damping system 10 is particularly suited for incorporation into the front, rear, or other suspension system of a bicycle. For example, the damping cartridge is ideally suited for use in a front bicycle suspension fork 50 as shown in FIG. 3, and as described in the '480 patent. Bicycle suspension fork 50 has a pair of telescoping struts 52, each having an inner tube 54 telescopingly received within an outer tube 56. It will appreciated that although inner tube 54 is shown as an upper tube, it is within the scope of the present invention to provide a bicycle fork in which the inner tube is, instead, a lower tube. In the '480 patent, the cartridge body has an integrally formed shoulder that mates with a recess in the inner tube of a strut of the telescoping fork assembly. As the shoulder seats against the recess, the cartridge unit is prevented from traveling upward into the upper strut. A snap-ring is then used to prevent the damping cartridge from traveling downward and out of the lower end of the upper strut.

Although the cartridge body 12 of the damping system 10 of the present invention may include an integral shoulder such as shown in the '480 patent, the addition of a shoulder generally requires the use of more material than would otherwise be necessary and incurs more difficulty and cost in manufacturing the cartridge body. Preferably, therefore, cartridge body 12 has a cartridge retaining ring 60, as illustrated in FIGS. 1 and 2, by which cartridge body 12 is secured against movement with respect to the strut 52 in which cartridge body 12 is positioned.

Cartridge retaining ring 60 comprises a thin cylindrical member made from a lightweight and preferably flexible material such as aluminum, or more preferable still, from plastic. Retaining ring 60 has first and second ends 62, 64, an outer surface 66, and an inner surface 68. Second end 64 has one or more ridges 70, formed along inner surface 68 to engage the groove or grooves 46 formed in second end 16 of cartridge body 12 as a result of the crimping process, as described above. For example, if cartridge body 12 is roll-crimped along its entire circumference, as is preferable, then retaining ring 60 will preferably incorporate a continuous ridge 70 along its inner surface 68 for engaging the roll-crimped groove 46. This preferred embodiment of cartridge retaining ring 60 is illustrated in FIG. 2.

As also shown in FIG. 2, retaining ring 60 preferably has a slit 72 extending longitudinally from first end 62 to second end 64. Slit 72 enables retaining ring 60 to be easily fitted over second end 16 of cartridge body 12 to bring ridge 70 into mating engagement with groove 46 on cartridge body 12. Ridge 70 is securely engaged and retained within groove 46 such that retaining ring 60 is securely fixed, at least axially, with respect to cartridge body 12.

Because retaining ring 60 is positioned about the outer surface 20 of second end 16 of cartridge body 12, retaining ring 60 adds to the thickness of second end 16 of cartridge body 12. Retaining ring 60 thus forms a shoulder 74 between first end 62 of retaining ring 60 and outer surface 20 of cartridge body 12. Shoulder 74 of retaining ring 60 permits retaining ring 60 to act as a shoulder insertable within a recess in strut 52 of fork 50 of FIG. 3. Thus, when damping system 10 is positioned within strut 52, as illustrated in FIG. 3, shoulder 74 engages a recess within strut 52 so that damping cartridge body 12 will remain fixed within strut 52. Preferably, damping cartridge body 12 is to be fixed within the bottom of inner tube 54 (the end inserted into the outer tube), as shown in FIG. 3, such that damping cartridge body 12 does not travel further into inner tube 54. A snap-ring, or another suitable fastener, seated in inner tube 54 may then be used to secure the seating of shoulder 74 within the recess of inner tube 54 and thereby to retain cartridge body 12 within inner tube 54. It will be understood that damping system 10 and fork 50 may, however, be configured such that damping cartridge 12 is secured within the outer tube.

The advantages achieved by damping system 10 and damping cartridge 12 of the present invention, as well as by the process for making the same as described above, will be clear to those skilled in the art. For example, a lightweight, low-cost damping cartridge is formed by using a crimping process to assemble the sealing element within the cartridge and thereby seal the ends of the cartridge. The use of crimping eliminates the need for snap-ring grooves, threads, or the like to be located on the cartridge body, thus reducing the required wall thickness of the cartridge body and also the manufacturing costs associated with forming snap-ring grooves, threads, or other mating surfaces on the cartridge body.

The use of crimping also eliminates the cost and weight of the snap-rings or other fastening devices themselves. In addition, the number of parts required for forming the damping cartridge is reduced, thereby reducing the complexity of the assembly itself, as well as the complexity and time required to perform the process of assembling the cartridge.

Material and manufacturing costs are further reduced by eliminating the need for a flange or an integral shoulder on the outer surface of the first end of the cartridge body. A cartridge using a retaining ring made of plastic, for example, may be lighter and less costly to manufacture than one using an integral shoulder.

While the foregoing description and drawings represent the preferred embodiments of the present invention, it will be understood that various additions, modifications and substitutions may be made therein without departing from the spirit and scope of the present invention as defined in the accompanying exemplary claim. In particular, it will be clear to those skilled in the art that the present invention may be embodied in other specific forms, structures, arrangements, proportions, and with other elements, materials, and components, without departing from the spirit or essential characteristics thereof. One skilled in the art will further appreciate that the invention may be used with many modifications of structure, arrangement, proportions, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims, and not limited to the foregoing description.

What is claimed is:

1. A damping system comprising:

a damping cartridge having a substantially cylindrical wall and first and second ends;

a first sealing element positioned at said first end of said damping cartridge body to close said first end of said damping cartridge body;

wherein a portion of said wall of said damping cartridge body is mechanically deformed adjacent said first sealing element to engage and compress said sealing element and thereby form a seal between said sealing element and said first end of said cartridge body;

a second sealing element positioned at said second end of said damping cartridge body to close said second end of said damping cartridge body end;

wherein a portion of said wall of said damping cartridge body is mechanically deformed adjacent said second sealing element to engage and compress said sealing element and thereby form a seal between said sealing element and said second end of said cartridge body; and a retaining ring positioned around the mechanically deformed portion of said second end of said cartridge body and axially fixed thereto.

2. A damping system as in claim 1, wherein said wall of said damping cartridge is mechanically deformed by being crimped.

3. A damping system as in claim 1, wherein said sealing elements further comprise first and second end caps respectively closing said first and second ends of said damping cartridge.

4. A damping system as in claim 3, wherein:

said damping cartridge body includes an inner surface; and said end caps include an outer sealing surface circumferentially positioned around said end caps and sealingly engaging said inner surface of said damping cartridge body.

5. A damping system as in claim 4, wherein said outer sealing surface comprises a groove formed circumferentially about said end caps and a seal positioned within said groove.

6. A damping system as in claim 5, wherein said seal is an O-ring.

7. A damping system as in claim 4, wherein:

said end caps are annular and include an inner sealing surface positioned about a hole formed through said end caps and concentric with said outer sealing surface; and said damping system further comprises a piston rod passed through said holes in said end caps and in sealing engagement with said inner sealing surfaces of said end caps, said piston rod carrying a piston fixedly coupled thereto and enclosed within said damping cartridge body.

8. A damping system as in claim 1, wherein:

said wall of said damping cartridge has an outer surface and is mechanically deformed by being crimped about said outer surface adjacent said first and second sealing elements, thereby forming a groove in said outer surface of said damping cartridge wall at least about said second sealing element;

said retaining ring has an inner surface having a ridge formed thereon; and said retaining ring is coupled to said cartridge body wall by engaging said ridge of said retaining ring within said groove in said damping cartridge wall about said second sealing element.

9. A damping system as in claim 1, further comprising:

a piston rod slidably extending through said damping cartridge body;

a piston mounted on said piston rod and enclosed within said damping cartridge body; and damping fluid contained within said damping cartridge body.

10. A damping system comprising:

a damping cartridge body having a first end, a second end, and a substantially cylindrical wall having an outer surface with a mechanically deformed portion at said second end of said damping cartridge body; and a retaining ring positioned around said cylindrical wall of said damping cartridge body and engaging said mechanically deformed portion in said outer surface of said damping cartridge body cylindrical wall to thereby fix said retaining ring axially with respect to said cartridge body;

wherein said damping cartridge body is formed of a first material and said retaining ring is formed of a second material lighter in weight than said first material.

11. A damping system as in claim 10, wherein:

said mechanically deformed portion is a groove in said outer surface of said damping cartridge body;

said retaining ring has an inner surface having a ridge formed thereon; and said retaining ring is coupled to said cartridge body wall by engaging said ridge of said retaining ring within said groove in said outer surface of said damping cartridge wall.

12. A damping system as in claim 11, wherein:

said retaining ring has a first end and a second end; and a slit is formed in said retaining ring from said first end to said second end to facilitate positioning of said retaining ring about said damping cartridge body to engage said ridge within said groove.

13. A damping system as in claim 10, wherein said first material is metallic and said second material is plastic.

14. A damping system as in claim 10, wherein:

said damping system is formed for positioning within a strut of a bicycle suspension fork, said strut having an inner tube telescopingly engaged within an outer tube;

said inner and outer tubes have an inner surface;

a recess is formed within said inner surface of one of said inner and outer tubes; and said retaining ring forms a shoulder with respect to said outer surface of said damping cartridge wall that is engaged within said recess in said one of said inner and outer tubes when said damping system is positioned within said strut of said bicycle suspension fork.

15. A method of forming a damping cartridge for a damping system comprising the steps of:

providing a tubular cartridge body having a first open end and a second open end and a cartridge body wall having an outer surface;

inserting a sealing element into said first and second open ends of said cartridge body;

deforming said cartridge body wall at said first and second ends and about said sealing elements therein to seal said first and second ends of said cartridge body;

forming a groove in said outer surface of said cartridge body wall as a result of said deforming step;

providing a retaining ring having an inner surface with a ridge formed thereon;

positioning said retaining ring over said cartridge body wall such that said ridge engages said groove to fix said retaining ring axially with respect to said cartridge body wall; and inserting said damping cartridge within the strut of a bicycle suspension fork such that said retaining ring engages within a recess within the strut to fix said damping cartridge against movement within said strut.

16. A method as in claim 15, wherein said deforming step comprises the step of roll-crimping said outer surface of said cartridge body wall to compress said sealing elements.

17. A method as in claim 15, wherein said step of inserting sealing elements further comprises the steps of:

providing end caps having circumferentially extending sealing surfaces;

positioning a seal within each of said circumferentially extending seating surfaces of said end caps;

inserting said end caps within said first and second open ends of said damping cartridge body such that said seals engage said cartridge body wall and are compressed by said deforming step.

* * * * *